United States Patent [19]

DiNicola

[11] Patent Number: 5,783,286
[45] Date of Patent: Jul. 21, 1998

[54] HOLLOW-CORE PLASTIC STRUCTURAL LUMBER ALTERNATIVE

[76] Inventor: James L. DiNicola, 507 Park Ave., Sycamore, Ill. 61078

[21] Appl. No.: 628,576

[22] Filed: Apr. 4, 1996

[51] Int. Cl.⁶ .............. B32B 3/20; F04C 2/54; D01D 5/20
[52] U.S. Cl. .......... 428/188; 428/178; 428/166; 52/790.1; 52/792.11; 264/167; 264/177.17; 264/209.1; 264/209.3; 264/240.1
[58] Field of Search .............. 428/178, 188, 428/166, 167, 120; 264/167, 171.12, 171.26, 173.17, 176.1, 177.17, 209.1, 209.3, 210.1; 52/790.1, 793.11

[56] References Cited

U.S. PATENT DOCUMENTS

| | | | |
|---|---|---|---|
| 2,315,634 | 4/1943 | McCall | 25/128 |
| 2,392,552 | 1/1946 | Roe | 72/41 |
| 2,621,075 | 12/1952 | Sedar | 299/104 |
| 2,660,878 | 12/1953 | Barnhart | 72/41 |
| 2,749,180 | 6/1956 | Andrews | 299/104 |
| 2,802,530 | 8/1957 | Kaufman | 164/108 |
| 2,814,529 | 11/1957 | Arnt | 299/104 |
| 3,100,917 | 8/1963 | Wagner | 20/16 |
| 3,220,062 | 11/1965 | Hermann | 20/11 |
| 3,485,912 | 12/1969 | Schrenk et al. | 264/171 |
| 3,935,357 | 1/1976 | Padavani | 428/178 |
| 4,172,749 | 10/1979 | Liggett | 428/188 |
| 4,246,305 | 1/1981 | Delattre | 428/36 |
| 4,338,273 | 7/1982 | Schnedecker | 264/167 |
| 4,513,048 | 4/1985 | Kaube et al. | 428/188 |
| 4,906,496 | 3/1990 | Hosono et al. | 428/36.9 |
| 5,052,164 | 10/1991 | Sandow | 52/790 |
| 5,079,053 | 1/1992 | Chang | 428/35.8 |
| 5,294,468 | 3/1994 | Chang | 428/35.8 |
| 5,294,472 | 3/1994 | Arnold et al. | 428/178 |
| 5,372,868 | 12/1994 | Prewo et al. | 428/167 |
| 5,438,858 | 8/1995 | Friedrichs | 72/260 |

*Primary Examiner*—Donald Loney
*Attorney, Agent, or Firm*—Leydig, Voit & Mayer, Ltd.

[57] ABSTRACT

A structural lumber alternative made of thermoplastic material has a generally hollow cross section, with a thick outer shell enclosing a central opening and at least one internal web disposed in the central opening and joining the outer shell. The internal web is a non-extruded unitary web of the same material forming the outer shell and is formed into position from the outer shell after the extruded outer shell leaves the extrusion device.

12 Claims, 3 Drawing Sheets

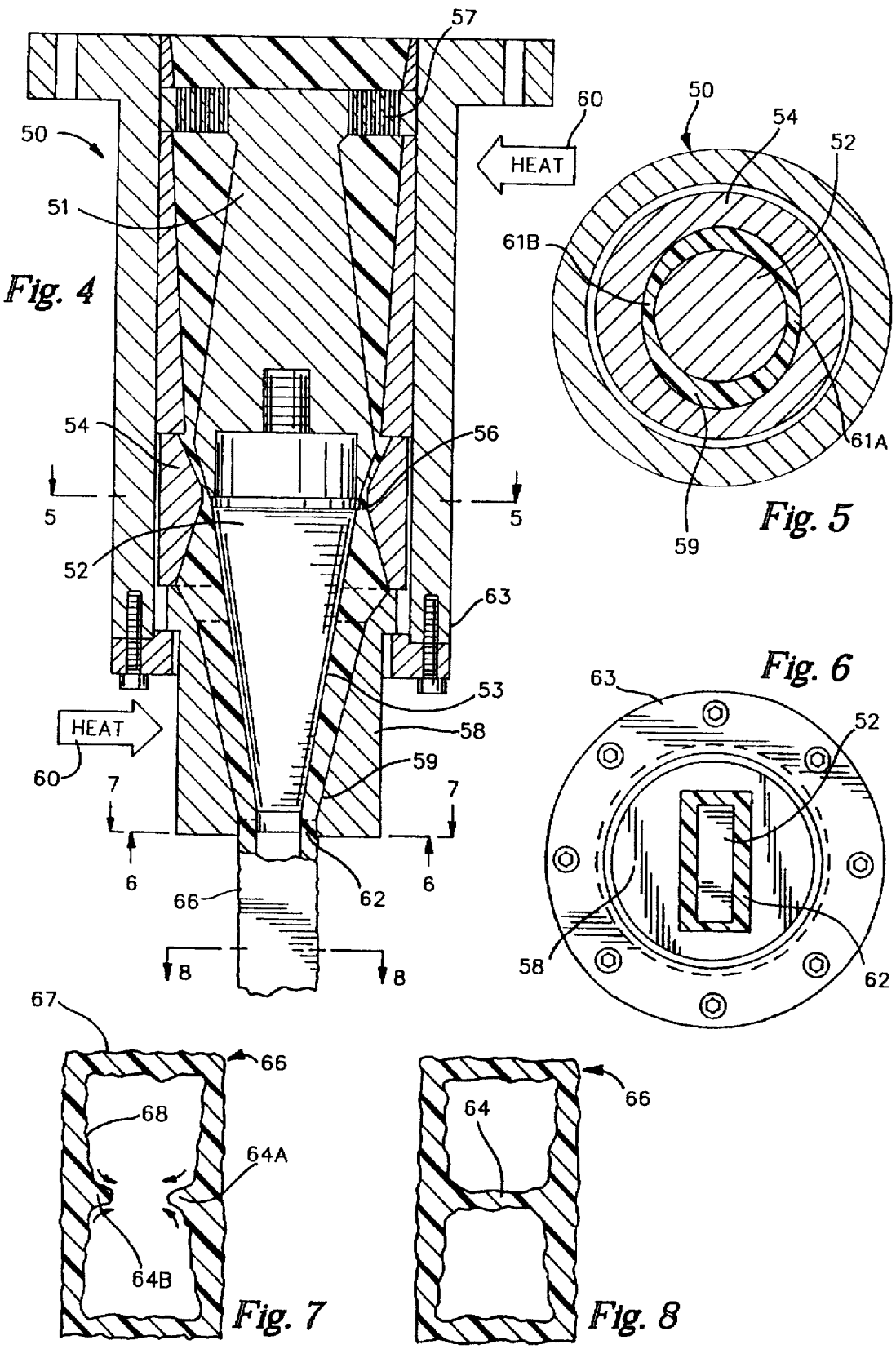

HOLLOW-CORE PLASTIC STRUCTURAL LUMBER ALTERNATIVE

FIELD OF THE INVENTION

The invention relates generally to alternatives for conventional lumber, and more particularly to structural lumber alternatives made of thermoplastic.

BACKGROUND OF THE INVENTION

Currently there is a significant need for a suitable alternative for conventional lumber. In the United States, as well as in many other countries, houses are almost completely made of wood, and lumber is extensively used in constructing the structural frames of houses. Accompanying the population growth, there is an increased demand for construction materials for new houses, which contributes to the increased harvesting of forests. As a result of extensive deforestation, the total area coverage of forests in this country as well as worldwide is shrinking, causing significant environmental and ecological problems. Providing a good lumber alternative would help to reduce the demand for lumber and thereby contributes to the conservation and restoration of forests.

Besides the concerns for environmental protection and ecological balance, the search for a suitable lumber alternative is also motivated by the desire to find a substitute which does not have the disadvantages of wood. Lumber decays with time, and has the tendency to deform in response to environmental humidity changes. Wood is also flammable, and is subject to attack by termites. Although specially treated lumber is available which is immune or resistant to termite infestation, the chemicals used to treat lumber are generally toxic and can pose significant danger to human health.

Moreover, it would be highly beneficial to find a lumber alternative which has better structural strength than wood. This is especially true in view of the increase in lumber costs which put emphasis on the use of lower cost, lower quality grades of lumber.

The present invention is also motivated by the need to convert plastic waste into useful products. Plastic is so widely used in our society that hardly any product on the market today does not have some components made of plastic. Because plastic materials such as polyethylene are relatively inexpensive, have good mechanical strength, and can be easily processed, plastic has been used to make disposable products such as milk bottles, detergent containers, housewares, toys, packaging materials, etc. As a consequence, plastic makes up about one quarter by volume and nearly one tenth by weight of the landfill refuse generated by our society, and most of the plastic waste decays very slowly with time. Almost all of the plastic waste can be recycled, and the question is whether useful and marketable products can be found that can be made of recycled plastic. Providing a useful product, such as a lumber alternative, made of recycled plastic can increase the recycling rate of plastic and helps to alleviate the problems created by the large quantity of refuse generated by our society.

Combining the need for a suitable substitute for lumber with the need to recycle used plastic into useful products, it is desirable to make a lumber alternative with recycled plastic. Plastic is a suitable material for making a lumber alternative because it is inert to humidity changes and free from termite infestation, and can be made stronger, more durable, and significantly less flammable than wood. Indeed, currently there is solid-core plastic lumber alternative made by extrusion process available on the market. Solid-core plastic lumber alternatives, however, have several significant disadvantages. Even if made of recycled plastic, a solid-core plastic lumber alternative can still be significantly more expensive than conventional lumber of the same size. The solid-core plastic lumber alternative is also much heavier than conventional lumber.

SUMMARY OF THE INVENTION

In view of the foregoing, it is a general object of the present invention to provide a lumber alternative made of plastic that has better structural strength and durability than wood, and can be produced at a significantly lower cost than solid-core plastic lumber.

It is a related object to provide a lumber alternative of plastic material that can be worked in substantially the same way wood is worked in construction applications. The importance of this object will be appreciated. If a lumber alternative can be used in substantially the same way wood is used, construction workers need not learn new skills or obtain new tools in order to use the lumber alternative, making it much easier for the construction industry to accept the lumber alternative.

In accordance with the above objects and other objects of the invention, there is provided a structural lumber alternative made of thermoplastic which is preferably formed into the standard sizes and shapes of conventional lumber. The lumber alternative is an extruded member which has a generally hollow and rectangular cross section with four exterior walls enclosing a central opening. Importantly, structural characteristics are substantially enhanced by forming at least one unitary internal web running longitudinally in the central opening and joining two opposed exterior walls. The walls of the extruded member are of sufficient thickness so that the walls are sufficiently workable, i.e. they can be sawed, nailed, drilled, screwed, etc. like wood lumber, and can reliably retain fasteners driven through them.

It is a feature of the invention that the internal web in the structural lumber alternative of the invention is formed in the extrusion process but is not directly extruded. In other words the dies and mandrels which shape the cross section of the member during extrusion, do not directly shape the web. Instead the web is formed from the material of the walls, and grows out of the walls after they leave the extrusion die, but before the plastic material completely solidifies. It is another important feature that the inner surfaces of the plastic lumber alternative are significantly rough, usually characterized by a herringbone pattern. The roughness of the inner surfaces contributes to the rigidity and strength of the structural lumber alternative of the present invention.

The structural lumber alternative according to the invention is formed by a single thermal extrusion process, and no post extrusion fabrication, such as plastic welding is required. According to the method of the invention, the melted plastic material is compressed through a generally annular opening. The width of the annular opening is arranged to be narrower in certain predefined regions of the opening so as to form constriction regions. The melted plastic material which is forced through the annular opening is then forced through a second opening at the end of the extrusion device to form the extruded outer shell (i.e. the inner and outer walls) of the structural lumber alternative. After the outer shell is extruded and before the plastic material which forms the outer shell solidifies, the plastic material spontaneously grows inwardly from the outer shell at locations corresponding to those of the constriction regions to form the web.

Other objects and advantages will become apparent from the following detailed description when taken in conjunction with the drawings, in which:

BRIEF DESCRIPTION OF THE DRAWINGS

FIG. 4 is a cross sectional view of a thermal extrusion device for producing the structural lumber alternative of the invention;

FIG. 5 is a cross sectional view of the thermal extrusion device taken along the line 5—5 of FIG. 4, showing a generally annular opening with constriction regions;

FIG. 6 is a front elevation of the extrusion device taken along the line 6—6 of FIG. 4, showing an opening between a mandrel and an extrusion die;

FIG. 7 is a cross sectional view of a board extruded from the extrusion device in FIG. 4, showing two protrusions forming on the inner surfaces of the walls of the extruded board;

FIG. 8 is a cross sectional view of the board in FIG. 7 after a web is formed in the central opening of the board;

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

Figure 1:
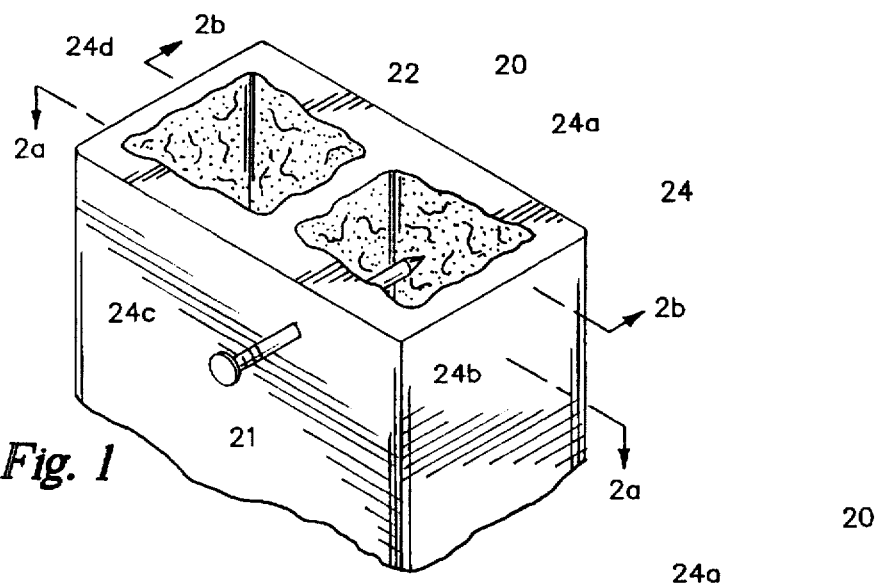
FIG. 1 is a perspective view showing an embodiment of the structural lumber alternative according to the invention.

Turning now to the Figures, FIG. 1 is a perspective view showing an embodiment of the structural lumber alternative 20 of the invention. Generally, the structural lumber alternative 20 of the invention is an extruded member of thermoplastic material which has an elongated shape, with its length significantly greater than its cross section. Because the structural lumber alternative 20 is formed by an extrusion process, it can be made much longer than the length of regularly available lumber, limited only by the capacity of the manufacturing facility. The structural lumber alternative 20 is generally hollow inside, with a thick thermally extruded outer shell 24 enclosing a central opening.

According to the invention, at least one internal web is provided in the structural lumber alternative for internal bracing. For example, in the embodiment shown in FIG. 1, a web 22 is disposed inside the thick outer shell 24. The web 22 runs longitudinally through the central opening and joins the thick outer shell 24 of the structural lumber alternative 20. Such an internal web increases the total surface area and provides an "I-beam" shaped internal bracing structure.

According to an important feature of the invention, the internal web 22 is a non-extruded unitary web but formed of the same melt and in the same process which formed the extruded shell. As will be described in greater detail below, the web 22 is not formed directly in the extrusion process which forms the outer shell 24, but is formed after the outer shell 24 leaves the extrusion device. The web 22 is a unitary web in the sense that it is formed from the same material which forms the extruded outer shell 24, and is formed at substantially the same time as the shell. What is meant by "at substantially the same time" is the fact that the web is formed in the same operation and of the same plastic melt as the shell, and before the formed article (with internal web) cools to its final rigid shape.

As will be described in greater detail below, the extruded shell is formed in such a way that a memory is created in the extruded material in its hot plastic state, so that after the shell is formed by extrusion dies, the memory in the hot plastic causes the formation of the internal web, after which the extruded member with internal web is cooled to form the structural lumber alternative. In other words, after extrusion, no additional processing steps are required to form the web after the outer shell 24 is extruded. The web is "spontaneously" formed.

For illustration purposes, the structural lumber alternative 20 shown in FIG. 1 has the shape of a board. Because the general object of this invention is to provide a substitute for wood lumber regularly used in construction, the structural lumber alternative of this invention preferably is made to have the standard shapes and sizes of wood lumber. For example, the plastic board shown in FIGS. 1 and 2 has the external shape and size of a conventional 2×4 wall stud. It will be understood, however, that the lumber alternative 20 is not limited to the shape of a board, but may be formed to have a variety of different shapes and sizes of commonly used structural lumber, such as plank, board, beam, etc. Indeed, if it is desirable in certain applications, the lumber alternative of the present invention may be formed to have shapes and sizes different from those of standard conventional lumber.

In the illustrated embodiment, the lumber alternative 20 has a generally hollow and rectangular cross section, with four exterior walls 24A–D surrounding a central opening. The web 22 runs longitude and through the central opening, and joins two opposed walls 22A and 22C.

Since the structural lumber alternative of the invention is designed to replace wood, the exterior walls 24A–D of the lumber alternative 20 must be sufficiently thick so that the structural strength of the lumber alternative 20 equals or surpasses that of a wood counterpart of the same size. Furthermore, the thickness of the walls 24A–D is such that the lumber alternative 20 is sufficiently workable, i.e. it can be worked on in substantially the way wood would be worked on in construction applications. Thus the thickness of the walls 24A–D is such that the walls can be nailed, drilled, screwed, glued, etc., and can take the impact of hammering. For example, FIG. 1 shows a nail 21 driven through an exterior wall 24C of the lumber alternative 20. The walls 24A–D are sufficiently thick so that a conventional lumber fastener such as a nail or a screw driven into the lumber alternative 20 through a wall is securely retained in the wall. The lumber alternative is also amenable to mechanical fixation techniques not normally associated with lumber, such as plastic or ultrasonic welding.

If the requirements of structural strength, workability and fastener retaining capability are met, the wall thickness can be further refined to suit other criteria. For example, it is highly desirable to select the wall thickness such that the unit weight of the structural lumber alternative is close to that of wood, thereby further improving its substitutability for conventional lumber. The strength, workability, and unit weight of the extruded member depend, of course, on the thermoplastic material used. In the preferred embodiment, the structural lumber alternative is made of high density polyethylene. Other suitable plastic materials useful in the invention include polypropylene PP, PET and PVC. Depending on the desired structural strength, fastener holding capability, and unit weight, the thickness of the walls can be varied. The wall thickness is typically within the range of 0.2 inch to 0.7 inch. With a unit weight similar to wood, a lumber alternative of this invention made of high density polyethylene is typically twice as strong as conventional lumber of the same size.

Figure 2A:
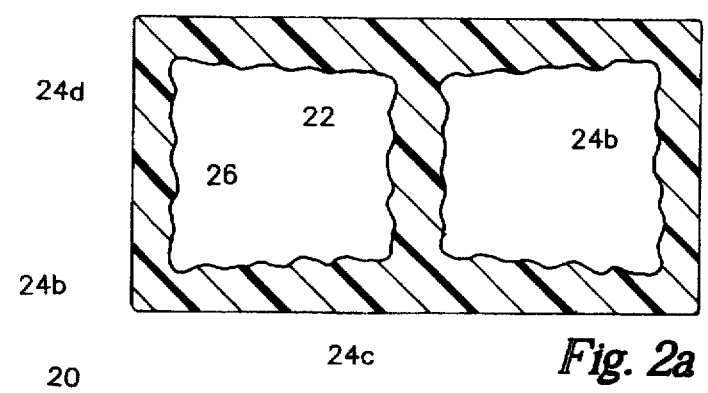
FIG. 2A is a cross sectional view of the structural lumber alternative taken along the line 2A—2A of FIG. 1.
Figure 2B:
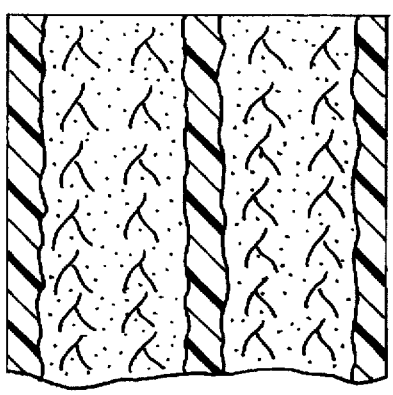
FIG. 2B is a cross sectional view of the structural lumber alternative taken along the line 2B—2B of FIG. 1.

As an important feature of the invention, the inner surfaces of the structural lumber alternative 20 are not smooth and flat but textured and significantly rough. As illustrated in FIGS. 2A and 2B, the inner surfaces, which include the inner surfaces 26 of the walls and the surfaces of the web 22, are multifaceted and wavy. The irregularity of those surfaces is an effect of the method of the invention for producing the lumber alternative, which method will be described in greater detail below. Due to the surface waviness and roughness, the surface area of the inner surfaces is substantially increased. The increased inner surface area contributes to the rigidity of the structural lumber alternative 20, and reduces the likelihood of deformation of the structural lumber alternative due to the creeping effect in plastic materials. Moreover, the surface irregularities are formed in a general herringbone pattern, which is best seen in the cross-sectional view in FIG. 2B. As will be described in greater detail below, the rough herringbone pattern is important not only for the mechanical characteristics it provides but also as a byproduct of the process and process conditions which form the spontaneously grown internal web. The herringbone pattern can thus be taken as an indication that the extrusion process for forming the lumber alternative 20 has been properly performed.

Figure 3:
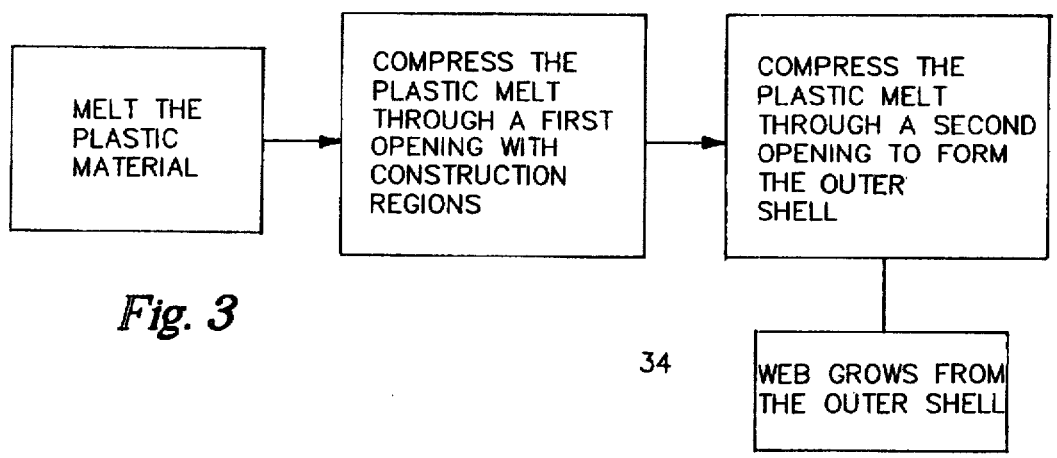
FIG. 3 is a schematic diagram showing the steps of the method for producing the structural lumber alternative of the invention.

The method for producing the structural lumber alternative of this invention will now be described in detail in conjunction with FIGS. 3-8. FIG. 3 is a schematic diagram showing the steps of the method of the invention for producing the structural lumber of the invention. The structural lumber alternative is produced using a thermal extrusion process. In the extrusion process the plastic material for forming the structural lumber alternative is first melted as illustrated in step 31. Typically, the plastic material will be recycled plastic which is first subjected to conventional preprocessing operations such as cleaning, shredding, mixing, and upon introduction to the extrusion machine, melting.

The melted plastic material is mixed and passed through the conventional screw type extrusion section of an extrusion machine to an extrusion head where, according to the invention, it is then compressed through a first opening which has a generally annular cross section, (step 32). The gap width in predefined sections of the annular opening is arranged to be smaller than other parts of the opening so as to form constriction regions, which produce localized areas of increased density in the stream of flowing plastic material. The melted plastic material forced through the annular opening then goes through a second opening, as illustrated in step 33, to form the extruded thick outer shell of the structural lumber alternative. After the extruded outer shell leaves the extrusion device the extruded material is free to relax. The exterior surface of the shell expands outwardly in a fairly uniform manner but the internal wall expands inwardly forming the roughened, herringbone surface. The constricted regions expand to a greater extent than the unconstricted regions causing the formation of protrusions growing inwardly from the outer shell at locations corresponding to those of the constriction regions before the plastic cools sufficiently to solidify, the protrusions join to form the web, (step 34). Thus the internal web is formed from the same melted plastic material as the outer shell, is non-extruded as it is formed only after the extruded outer shell has left the extrusion device, but is formed of the same melt as the extruded walls insofar as the plastic is not remelted (or welded) but the web forms spontaneously before the extruded section cools.

FIG. 4 is a cross sectional view showing an embodiment of a thermal extrusion device 50 for producing the structural lumber alternative of this invention. The extrusion device 50 comprises a mandrel 52, a mandrel holder 51, a back pressure ring 56, and an extrusion die 58. In this embodiment, one end of the mandrel 52 and the back pressure ring 54 define a generally annular opening 56, the shape of which is shown in FIG. 5. The plastic material for the structural lumber alternative is melted before it is introduced into the extrusion device 50 through the breaker plate 57 on the mandrel holder 51. The melted plastic material is then compressed to pass through the annular opening 56 between the mandrel 52 and the back pressure ring 54. After being forced through the annular opening 56, the melted plastic material is then passed through a second opening 62 between the other end of the mandrel 52 and the extrusion die 58 to form the extruded exterior walls of a board 66.

FIG. 5 shows the shape of the annular opening 56 between the mandrel 52 and the back pressure ring 54. The mandrel 52 at this point has a circular cross section. It will be seen that the gap width of the annular opening 56 is arranged to vary around the mandrel 52, being smaller in predefined regions than other parts of the opening. The regions with narrower gap width thus form constriction regions 61A and 61B, where the melted plastic material passing through will be compacted more than at other parts of the annular opening. As will be described below, more than two constrictions can be arranged around the annular opening 56, and the number and locations of the restriction regions determine the number and positions of the internal webs in a lumber alternative of this invention.

FIG. 6 is a front elevation of the extrusion device 50, showing the extrusion die 58, the mandrel 52, and a retaining ring 63 which secures the extrusion die 58 in position. The end of the mandrel 52 and the extrusion die 58 define an opening 62 through which the melted plastic material is extruded to form the outer shell of the structural lumber alternative. The opening 62 thus defines the shape of the structural lumber alternative. The opening 62 as shown in FIG. 6 is for making a 2×4 board and thus has a rectangular shape. According to the invention, however, the opening 62 can have other shapes and sizes, depending on the cross section of the piece to be made. For example, if the structural lumber alternative is to have a circular cross section, then an annular opening will be used.

Returning now to FIG. 4, in accordance to an aspect of the invention, as the melted plastic material is forced through the extrusion device 50, the plastic material close to the inner surface of the extrusion die 58 is less viscous than the plastic material near the surface 53 of the mandrel 52. This is a result of heat applied to the exterior of the extrusion device 50 so that the temperature of the plastic material at the surface 59 is higher than the plastic material near the surface 53. The heat source, denoted schematically by an arrow 60, is typically produced by heating bands applied to the extrusion device. A temperature gradient is thus created across the plastic material between the mandrel 52 and the extrusion die 58. Because the plastic material moving along the surface 53 of the mandrel is at a somewhat lower temperature and is therefore more viscous, there is more interaction, or drag, between the surface 53 of the mandrel 52 and the plastic material that flows over it.

Referring now to FIG. 7, after the plastic material leaves the extrusion die 58 to form the board 66, the plastic material on the outside, which is hotter and less viscous, is allowed to expand freely. The lower viscosity and the free expansion allows the outer surface 67 to develop into a relatively smooth surface. On the other hand, the material on the inside of the board 66 expands into the closed opening surrounded by the outer walls. The expansion reduces the internal surface area of the closed opening, causing the internal surface to deform and generate surface irregularities. The surface deformation and the interaction between the plastic material and the surface of the mandrel 52 before the material leaves the extrusion device work together to produce the herringbone pattern illustrated in FIG. 2B.

At the same time, an internal unitary web gradual grows into position. It will be appreciated that only the thick outer shell of the board 66 is extruded through the opening 62, and that the unitary internal web is not yet formed when the outer shell leaves the extrusion die 58. It is a feature of the invention that after the outer shell leaves the extrusion die, the internal web begins to be formed into place before the plastic material forming the outer shell solidifies. An illustration of the formation of the web is found in FIGS. 7 and 8. FIG. 7 shows the board 66 after it leaves the extrusion die 58 and before a web is completely formed. It will be seen that, in this example, at two points on the inner surfaces of the board 66 the plastic material begins to bulge and protrude toward the center of the board 66. The protrusions 64A and 64B are caused by the stored stress in the melted plastic material caused by being forced through the constriction regions 61A and 61B shown in FIG. 5. The locations of the protrusions 64A and 64B therefore correspond to those of the constriction regions 61A and 61B between the mandrel 52 and the back pressure ring 54 shown in FIG. 5. After the protrusions 64A and 64B extend a sufficient distance inwardly, they meet and fuse together to form a web. FIG. 8 shows the cross section of the board 66 after the web 64 is formed. The amount of time it takes for the web 64 to be formed depends on many factors, such as the viscosity of the melted plastic material, the compression pressure in the extrusion process, the size of the protruded member, etc. Typically, a web is formed within four inches after the board 66 leaves the extrusion device.

There are many different types of thermoplastic materials such as low density polyethylene, high density polyethylene, polypropylene, polyvinyl chloride that can be used with the method described above to make the structural lumber alternative of this invention with different hardness, strength, and weight. High density polyethylene is the preferred plastic material because the structural lumber alternative made of high density polyethylene resembles wood lumber in terms of workability and weight, while at the same time having comparable structural strength of wood. Recycled sources of polyethylene are also plentiful. Milk bottles and similar containers made of high density polyethylene are often separately collected for recycling, forming a significant source of readily available and inexpensive raw materials. It will be appreciated, however, the lumber alternative can also be made of virgin plastic material, although at a higher cost. In order to improve the durability of the structural lumber alternative of this invention, free radical inhibitors and light masking agents are preferably added to the plastic material for forming the structural lumber alternative. Such additives include, but are not limited, to self-extinguishing (SE) and ultra-violet (UV) additives.

Figure 9:
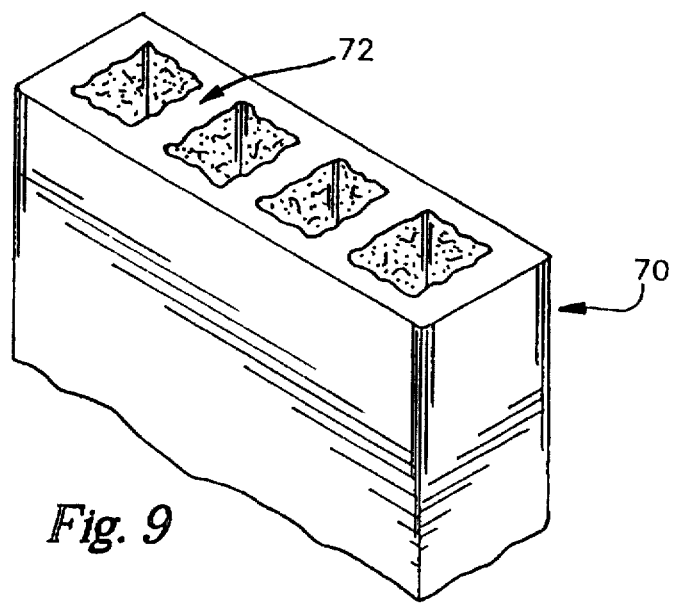
FIG. 9 is a perspective view showing an alternative embodiment of the structural lumber alternative of this invention which has three internal webs.
Figure 10:
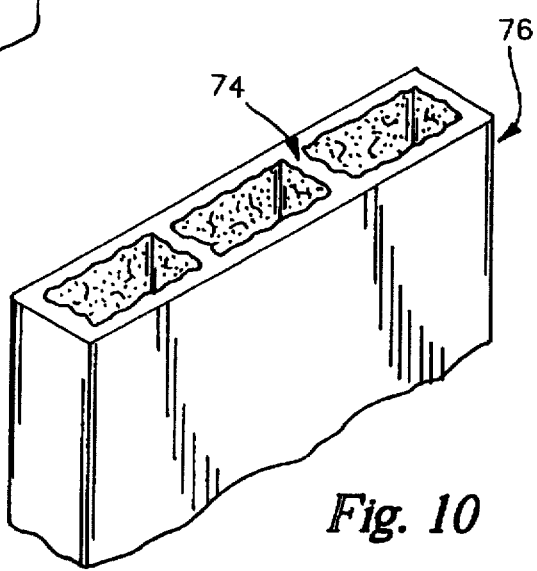
FIG. 10 is a perspective view showing yet another alternative embodiment of the structural lumber alternative of this invention which has two internal webs.
Figure 11:
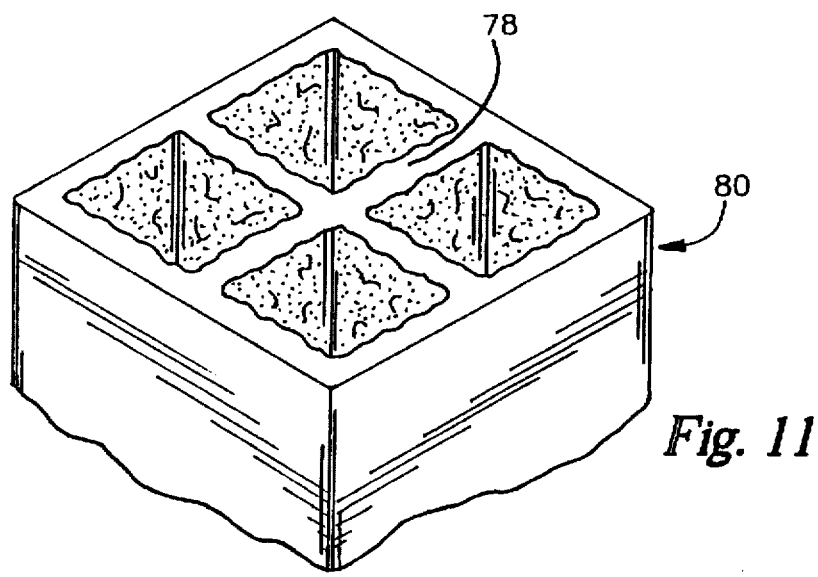
FIG. 11 is a perspective view showing yet another alternative embodiment of the structural lumber alternative of the invention which has a cross-shaped web.

The parameters of the extrusion process described above, such as the pressure and temperature of the melted plastic material in the extrusion device, depend on the plastic material and additives used in the manufacturing process. After the web in the structural lumber alternative of the invention is formed, the structural lumber alternative can undergo other types of processing commonly combined with extrusion processes. For example, referring now to FIG. 8, after the web 64 in the board 66 is formed, the board 66 can be passed through a sizer which serves to precisely define the dimensions of the board and to smooth the outer surfaces of the board. It will be appreciated by persons skilled in the art that the method of this invention is not limited to producing rectangular boards with only one web. The shape and size of the structural lumber alternative produced can be changed by changing the opening 62 defined by the mandrel 52 and the extrusion die 58 as shown in FIG. 6. Furthermore, different number and locations of webs can be formed in the structural lumber alternative of this invention by passing the melted plastic material through an opening, such as the opening 56 defined by the mandrel 52 and the back pressure ring 54 as in FIG. 5, with properly distributed constriction regions. For example, FIG. 9 shows a perspective view of a plastic board 70 which has the shape of a 2×8 board, with three longitudinal internal webs 72 disposed parallel to each other. FIG. 10 shows, as another example, a plastic board 76 which has the shape of a 1×8 board with two parallel internal webs 74. Furthermore, the web in the structural lumber alternative can be made to have more complicated cross sectional shapes. For example in FIG. 11, a member 80 such as a 4×4 is shown with a web 78 having a cross-shaped cross section is shown is FIG. 11. This cross-shaped web 78 can be formed, for example, by arranging four equally spaced constriction regions in the opening 56 around the mandrel 52 in FIG. 5.

It will be appreciated now that what has been provided is a plastic structural lumber alternative which is stronger and more durable than wood lumber and can be worked like wood. The structural lumber alternative of the invention has a generally hollow cross section and one or more unitary internal webs for internal bracing. Such a structure provides low weight and high strength. The structural lumber alternative can be produced of recycled plastic material using a single thermal extrusion process. As a feature of the invention, the unitary web in the structural lumber alternative grows into place after the exterior walls of the structural lumber alternative are extruded.

What is claimed is:

1. A structural lumber alternative comprising:
   an extruded member of thermoplastic material having a length which is substantially greater than its cross sectional dimension, the cross section of the extruded member being generally rectangular and hollow having four exterior walls surrounding a central opening, the exterior walls being sufficiently thick and workable to withstand the operations of sawing, nailing, screwing, and gluing;

at least one longitudinal web through the central opening joining two opposed walls of the extruded member, the internal web being a unitary non-extruded web characterized by a non-extruded herringbone surface and formed of the same melt which formed the walls; and the internal web lending sufficient structural rigidity to the extruded member so that the extruded member has strength and weight characteristics comparable to those of lumber.

2. A structural lumber alternative as in claim 1, wherein the walls of the central opening and of the web are wavy and have surface irregularities in a herringbone pattern formed during solidification after extrusion.

3. A structural lumber alternative as in claim 2, wherein the extruded member has exterior surfaces of a degree of smoothness comparable to that of wood.

4. A structural lumber alternative as in claim 1, wherein the exterior walls and the web are dimensioned such that the structural lumber alternative has a weight per unit length similar to that of wood.

5. A structural lumber alternative as in claim 1, wherein the thickness of the exterior walls is about 0.25 inch to 0.625 inch.

6. A structural lumber alternative as in claim 1, including a plurality of longitudinal webs disposed generally parallel to each other.

7. A structural lumber alternative as in claim 1, wherein the longitudinal web has a cross-shaped cross section.

8. A structural lumber alternative as in claim 1, wherein the structural lumber alternative is made of high density polyethylene.

9. A method for producing a structural lumber alternative of thermoplastic material and having a thick outer shell enclosing a central opening and a unitary internal web disposed in the central opening and joining the outer shell, the method comprising:

melting the thermoplastic material;

compressing the melted plastic material through a generally annular opening, the gap width of the opening being arranged to be narrower in predefined sections of the opening so as to form constriction regions; and passing the melted plastic material through a second opening to extrude the outer shell but not the internal web of the structural lumber alternative, relaxing the outer shell after extrusion and before cooling to the extent necessary to grow a unitary internal web from constriction region to constriction region, fusing the material in the web to structurally reinforce the shell.

10. A method as in claim 9, including the step of passing the structural lumber alternative through a sizer to define the dimensions of the structural lumber alternative after the internal web is formed.

11. A method as in claim 9, wherein the plastic material for forming the structural lumber alternative is high density polyethylene.

12. A method as in claim 9, including the step of externally heating the plastic material to provide a temperature gradient in the plastic material before the step of passing such that the outer shell formed in the step of passing has an outer surface less viscous than an inner surface of the outer shell.

* * * * *